May 24, 1960     J. J. HARRIS ET AL     2,937,907
AUXILIARY QUICK SERVICE VENTING MECHANISM
Filed Nov. 28, 1958
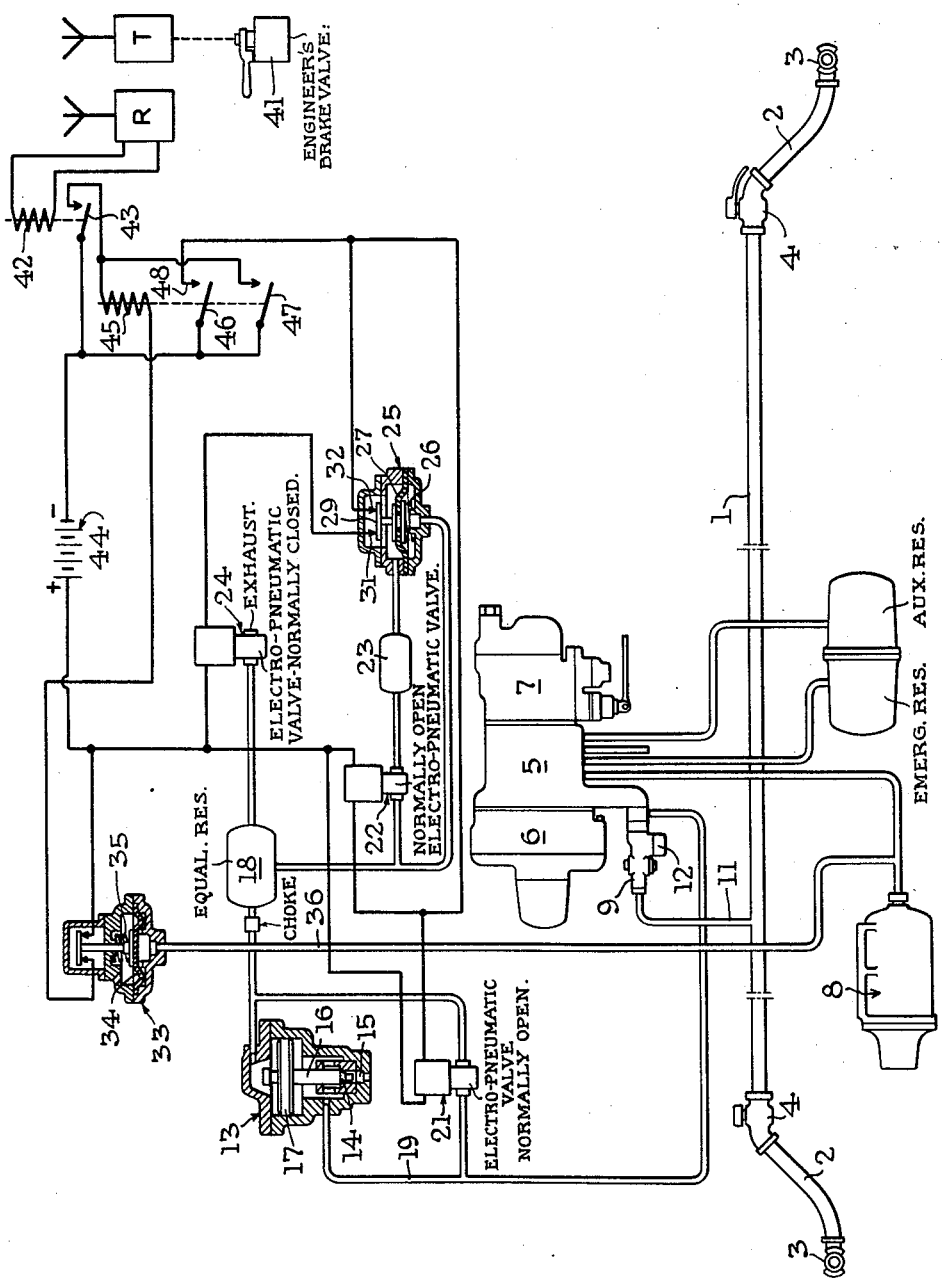
INVENTORS
John J. Harris
and Ralph C. Ross
BY 
ATTORNEYS

2,937,907

AUXILIARY QUICK SERVICE VENTING MECHANISM

John J. Harris, Mahopac, and Ralph C. Ross, Watertown, N.Y., assignors to The New York Air Brake Company, a corporation of New Jersey Filed Nov. 28, 1958, Ser. No. 776,873

5 Claims. (Cl. 303—16)

This invention relates to fluid pressure brakes of the automatic type and will be described as associated with an AB brake, because the invention relates to braking on long trains and the AB brake is the presently established long train brake system in this country. The invention could be used to accomplish similar results with other automatic brakes.

The prime purpose of the invention is to shorten the time required for transmission of a brake application on long trains, and thus reduce braking shocks. It does so by initiating a quick service reaction in the brake pipe at the rear of the train as an incident to the initiation of a quick service reaction in the brake pipe at the head end. Alternatively such reactions could be initiated simultaneously at different points throughout the length of the brake pipe.

In the preferred embodiment, means are provided to suspend the action of the auxiliary quick service mechanism after it has once functioned and until the related application has been released whereupon it resets preparatory to the next application.

Loosely stated, the engineer's brake valve is caused to transmit a brief transitory and selectively coded radio signal to a receiving station at or near the rear end of the train, or to such stations spaced along the length of the train, and so contrived as to cause a local reduction of quick-service intensity. In the AB system such reductions, once initiated, are self propagating throughout the length of the brake pipe. The invention starts such propagation at one additional point in the brake pipe, or at several additional points.

Selective coding is familiar practice in the radio art and need not be elaborated here, beyond pointing out the importance of limiting response to the transmitter associated with the engineer's brake valve on the particular train. Selectivity that will reject signals from trains on adjacent tracks is an obvious minimum requirement but even closer selectivity is desirable, and attainable by known means.

The signal transmitting station is associated with and operated by the engineer's brake valve and is a part of the locomotive equipment. The receiving station and the associated mechanism for causing a quick-service reduction of brake pipe pressure are mounted on a specially equipped car. Where this should be the end car, it is logical to call this the caboose. One can readily imagine additional "caboose" cars so equipped and interspersed in the train. One at the rear end would serve to show the principle. In fact, all that need be illustrated here is the conventional brake equipment for a caboose complete with signal receiver conventionally represented and the added valves and circuits of the invention, also an engineer's brake valve with a signal transmitter conventionally represented and capable of radiating a transitory signal as the brake valve is shifted toward service position from running position.

The invention will now be described by reference to the accompanying drawing, in which:

The single view shows the brake equipment for a caboose, part in elevation and part in simplified section. A radio transmitter and receiver are shown in diagram, associated with a conventional engineer's brake valve (which has a running position and a service application range) and with a brake-controlling valve device (AB valve), respectively.

The parts are shown as they would be with the system charged and brakes released.

The brake pipe 1 extends the length of the train from the locomotive, along each car to the caboose. Intercar connections comprise the usual flexible hose 2 with couplings 3 and angle cocks 4.

A brake-controlling valve device of the AB type comprises a pipe bracket 5, emergency portion 6 and service portion 7 with emergency and auxiliary reservoirs (indicated by legends) and brake cylinder 8. The AB brake valve is described in Farmer Patent No. 2,031,213, dated February 18, 1936. A branch pipe 11 leads from the brake pipe 1 to the cut-out cock 9 and thence through a dust collector 12, which is constructed as a unit with the cock 9. All these parts and their connections, as shown, are standard in the commercial art.

As will be apparent, the cut-out cock 9 is so located that its closure isolates from the brake pipe 1 not only the AB valve, but also the pneumatic parts added thereto according to the present invention.

Each car in the train carries the parts enumerated in the preceding paragraph. The caboose, and any other cars equipped according to the invention, include means to effect a local quick service reduction of brake pipe pressure, so characterized because it is limited both in rate and extent.

The reduction is caused by the controlled opening of a normally closed equalizing discharge valve generally indicated by the numeral 13 applied to its body. Like the equalizing discharge valves used in engineer's brake valves, this comprises a poppet valve 14 normally closing against a seat to graduate an atmospheric vent port 15. The valve is formed on a stem 16 fixed to a reciprocable piston 17 which is subject, on its upper face, to pressure in an equalizing reservoir 18 normally charged to brake pipe pressure and subject, on its smaller lower face, to pressure in the brake pipe 1 admitted through branch pipe 19. This assures gradual closure. Observe that closure of cock 9 would interrupt charging flow through pipe 19.

A normally open electropneumatic valve 21 controls charging flow from the brake pipe 1 to reservoir 18 through a by-pass which leads past valve 13. As indicated by a legend, a choke limits flow rate to and from the reservoir 18. A second normally open electropneumatic valve 22 controls communication between reservoir 18 and a smaller stabilizing volume 23, permitting a portion of the reservoir charge to be trapped. A normally closed electropneumatic valve 24 controls venting flow from equalizing reservoir 18. The rate of said venting flow is fixed semi-permanently interchangeable chokes screwed into the exhaust port of valve 24, which port is identified by the legend "Exhaust." The choke is not visible in the drawing.

A differential pressure switch 25, biased in a closing direction by spring 26, responds to the opposed pressures in reservoir 18 and in the portion trapped in stabilizing volume 23, acting on diaphragm 27. When pressure in reservoir 18 fails below pressure trapped in volume 23 by an amount determined by the spring 26, the contactor 29 moves away from contacts 31, 32 causing valve 24 to close. Thus brake pipe reduction caused by the opening of equalizing discharge valve 13 is limited to a prechosen amount.

To prevent the reopening of equalizing discharge valve 13 while a brake application continues in effect, a pressure switch 33, having diaphragm 34 subject to pressure in brake cylinder 8, is so loaded by spring 35 that it will open in response to brake cylinder pressure communicated through pipe 36 and remain open so long as pressure in brake cylinder 8 remains higher than an amount usually attained by a normal quick service reduction of brake pipe pressure.

Opening of switch 33 disables the relay which puts the auxiliary quick-service mechanism into action.

A conventional engineer's brake valve 41, having a running position and a service application range, has the usual connections to main reservoir, brake pipe 1, and other conventional parts of the head end brake equipment. Since such parts are not involved in the invention, they have not been illustrated.

So far as is here material, the brake valve 41 is so connected to a radio or other transmitter T that motion of the brake valve from running position toward the application range causes the transmitter T to send out a short radio signal which is picked up by the receiver R, and causes the coil 42 to pick up contactor 43 and close circuits from battery (or other source of current) 44 through control circuits.

The initial effect is to energize coil 45 which lifts contactors 46, 47. Contactor 47 acts as a sticker so that both contactors remain up even after contactor 43 has dropped. Thus contactor 46 maintains a circuit through contact 48.

As will be clear from the wiring diagram, this energizes the electro-pneumatic valves 21, 22 and 24, so that the equalizing reservoir 18 is cut off from the brake pipe branch 19 (by valve 21), volume 23 is isolated from equalizing reservoir 18 (by valve 22), and equalizing reservoir 18 is bled to atmosphere (by valve 24) at a rate controlled by a choke in its exhaust port.

Reduction of pressure above piston 17 causes equalizing discharge valve 13 to open and produce a local quick-service reduction of brake pipe pressure.

The differential pressure switch 25 will open at a predetermined differential so chosen as to terminate venting flow after occurrence of a gradual reduction which approximately matches but does not exceed the conventional quick-service reduction started at the brake valve 41. In this way, the valve 13 is controlled to afford a gradual tapered reduction rate of brake pipe pressure, terminating without echo-generated surges such as might cause brake release. When the pressure in the caboose brake cylinder reaches the setting of switch 33, it opens, deenergizes coil 45 and thus causes the quick service devices to reset.

Then, until the brake has been released and the pressure in brake cylinder 8 and pipe 36 has been reduced to less than the setting of switch 33, there can be no further response to a signal from transmitter T.

It follows that quick-service action on the caboose (or on any similarly equipped car) can be had only in the initial portion of a brake pipe pressure reduction.

Many modifications of detail are possible. For example, two electropneumatic valves 21 and 22 are shown despite the fact that they are operated in the same sense, simultaneously, and by the same controlling means. As compared to duplex or double ported valves operated by a single actuator, the two very simple stop valves, each with its own actuator, are economical to produce and install and afford a wider choice of valve locations. No functional difference between these two arrangements is involved.

There is a wide range of choice in relays and those diagrammed are elementally simple.

An important feature is the fact that the functional connection, radio or other, provided between the engineer's brake valve 41 and the equalizing discharge valve 13, is independent of the brake pipe, and is not affected by brake pipe pressure or by the length of the train. The differential pressure switch causes the auxiliary quick service venting to match that of the brake system.

What is claimed is:

1. In a fluid pressure train brake system which includes an engineer's brake valve having a running position and an application range; a normally charged brake pipe, the pressure in which is controlled by said brake valve; a plurality of brake cylinders and automatic brake-controlling devices each responsive to pressure reduction in the brake pipe to develop brake-applying pressure in respective related cylinders; the improvement which consists in connecting to said brake pipe at least one auxiliary brake pipe venting mechanism comprising: means enclosing an equalizing volume; means for charging said volume from the brake pipe; an equalizing discharge valve normally closing a vent from the brake pipe and including a piston urged in a valve-closing direction by pressure in said volume and urged in the opposite direction by brake pipe pressure; first electropneumatic means operable when energized to bleed said volume gradually; other electropneumatic means operable when energized to isolate said volume from the brake pipe and to trap a portion of the charge then in said volume; a normally closed differential pressure switch controlled by the pressure in said volume acting in opposition to the pressure of said trapped portion; energy-transmitting means for actuating all said electropneumatic means; connections through which said engineer's brake valve, upon its initial motion toward its application range, activates said energy-transmitting means; connections through which said differential pressure switch deenergizes said first electropneumatic means upon reduction of pressure in said volume below the pressure of said trapped portion; and switch means subject to pressure in the brake cylinder and effective above a chosen brake cylinder pressure to inhibit reenergization of all said electropneumatic means.

2. The system defined in claim 1 in which said other electropneumatic means comprise two separate normally-open electropneumatic valves respectively controlling isolation of said equalizing volume and the trapping of a portion of its charge, and the electric circuit portions of said two electropneumatic valves by-pass said differential pressure switch.

3. The system defined in claim 1 in which said energy-transmitting means include a relay characterized by ability to reset itself, and said switch means subject to pressure in the brake cylinder inhibits such resetting while said cylinder is under a predetermined pressure.

4. The system defined in claim 1 in which the automatic brake-controlling devices include means for locally producing quick service reductions of brake pipe pressure and also means for limiting such reductions, and said equalizing volume and the trapped portion of its charge are relatively so proportioned that the auxiliary brake pipe venting mechanism produces similarly limited reductions.

5. In a fluid pressure train brake system which includes an engineer's brake valve having a running position and an application range; a normally charged brake pipe, the pressure in which is controlled by said brake valve; a plurality of brake cylinders and automatic brake-controlling devices each responsive to pressure reduction in the brake pipe to develop brake-applying pressure in respective related cylinders; the improvement which consists in connecting to said brake pipe at least one auxiliary brake pipe venting mechanism comprising: means enclosing an equalizing volume; means for charging said volume from the brake pipe; an equalizing discharge valve normally closing a vent from the brake pipe and including a piston urged in a valve-closing direction by pressure in said volume and urged in the opposite direction by brake pipe pressure; first electropneumatic means operable when energized to bleed said volume gradually; other electropneumatic means operable when energized to isolate said volume from the brake pipe and to trap a portion of the charge then in said volume; a normally closed differential pressure switch controlled by the pressure in said volume acting in opposition to the pressure of said trapped portion; energy-transmitting means for actuating all said electropneumatic means; connections through which said engineer's brake valve, upon its initial motion toward its application range, activates said energy-transmitting means; and connections through which said differential pressure switch deenergizes said first electropneumatic means upon reduction of pressure in said volume below the pressure of said trapped portion.

References Cited in the file of this patent

UNITED STATES PATENTS

| | | |
|---|---|---|
| 1,082,295 | Turner | Dec. 23, 1913 |
| 1,214,615 | Turner | Feb. 6, 1917 |
| 2,061,916 | Miller | Nov. 24, 1936 |